Figure 1:
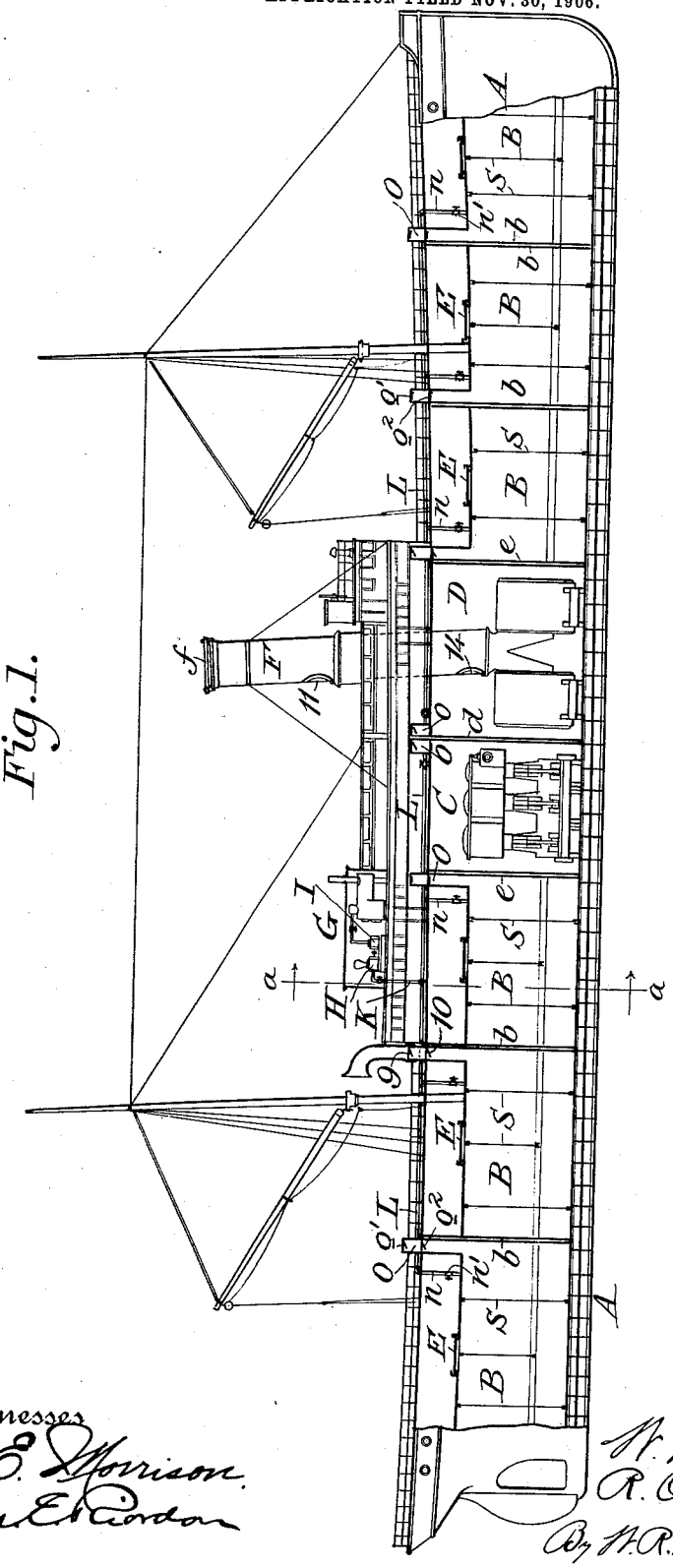

No. 851,269. PATENTED APR. 23, 1907.
W. W. WOTHERSPOON & R. O. KING.
VESSEL CONSTRUCTION.
APPLICATION FILED NOV. 30, 1906.
3 SHEETS—SHEET 3.
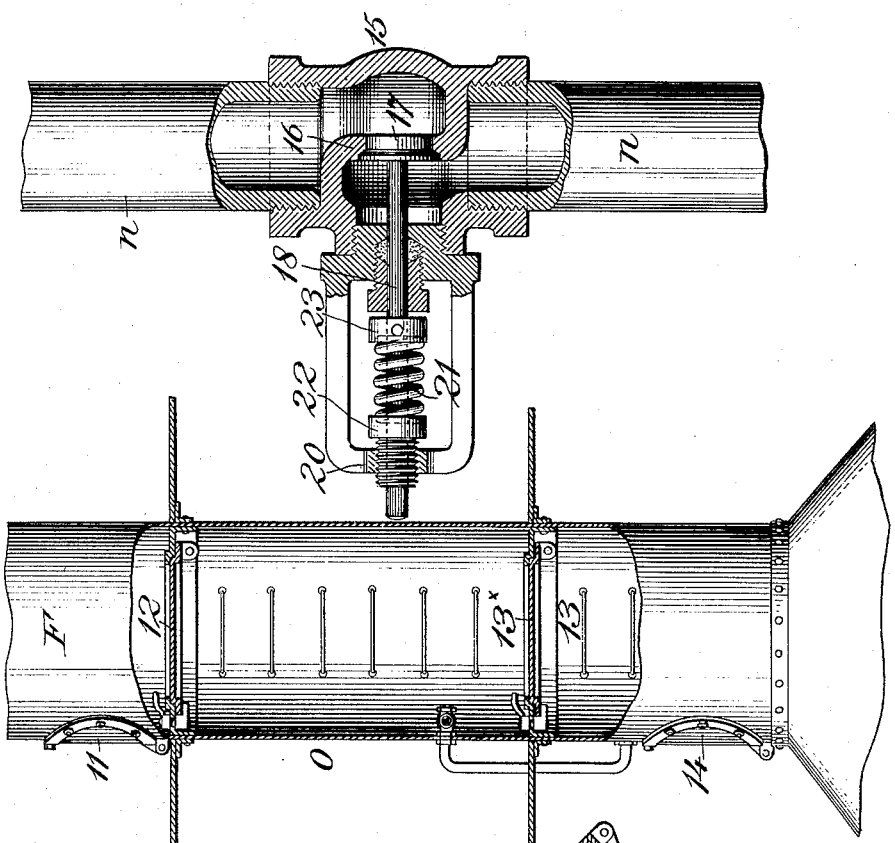
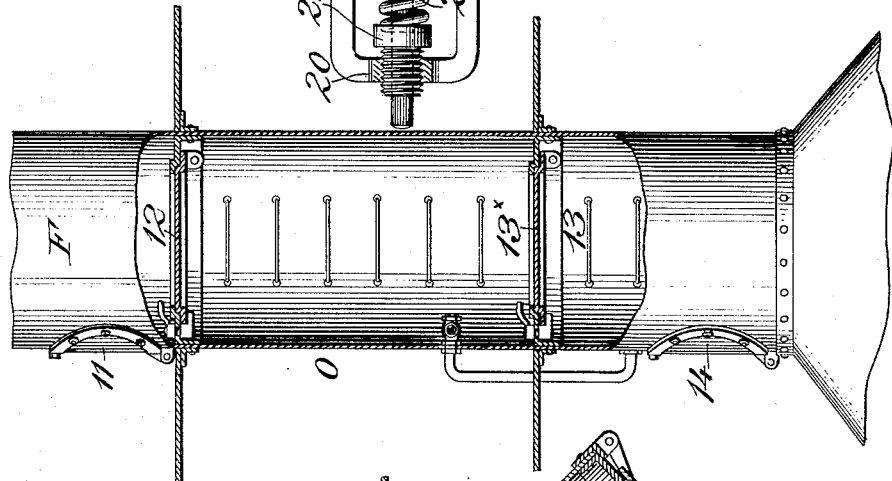
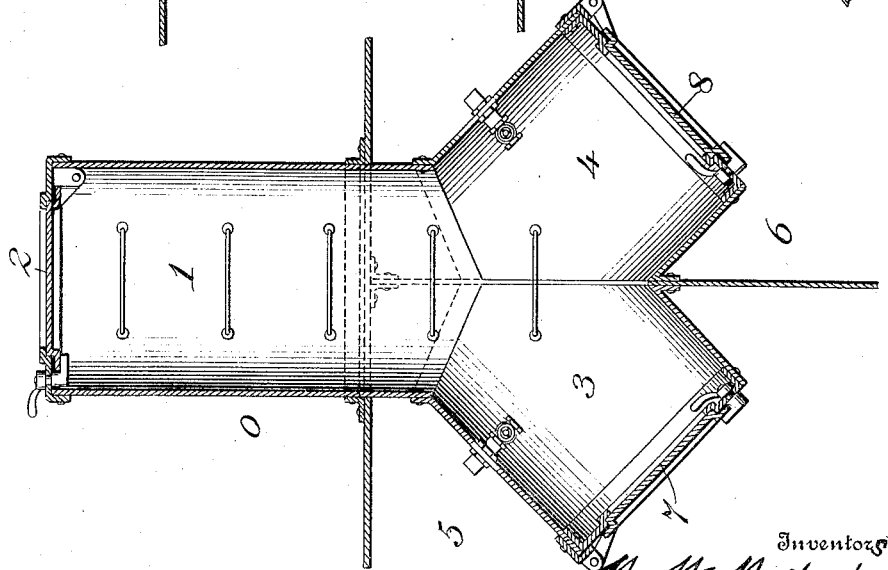
Witnesses
L. E. Morrison
Chas. E. Riordan
Inventors
W. W. Wotherspoon
R. O. King
By W. R. Kennedy
Attorney

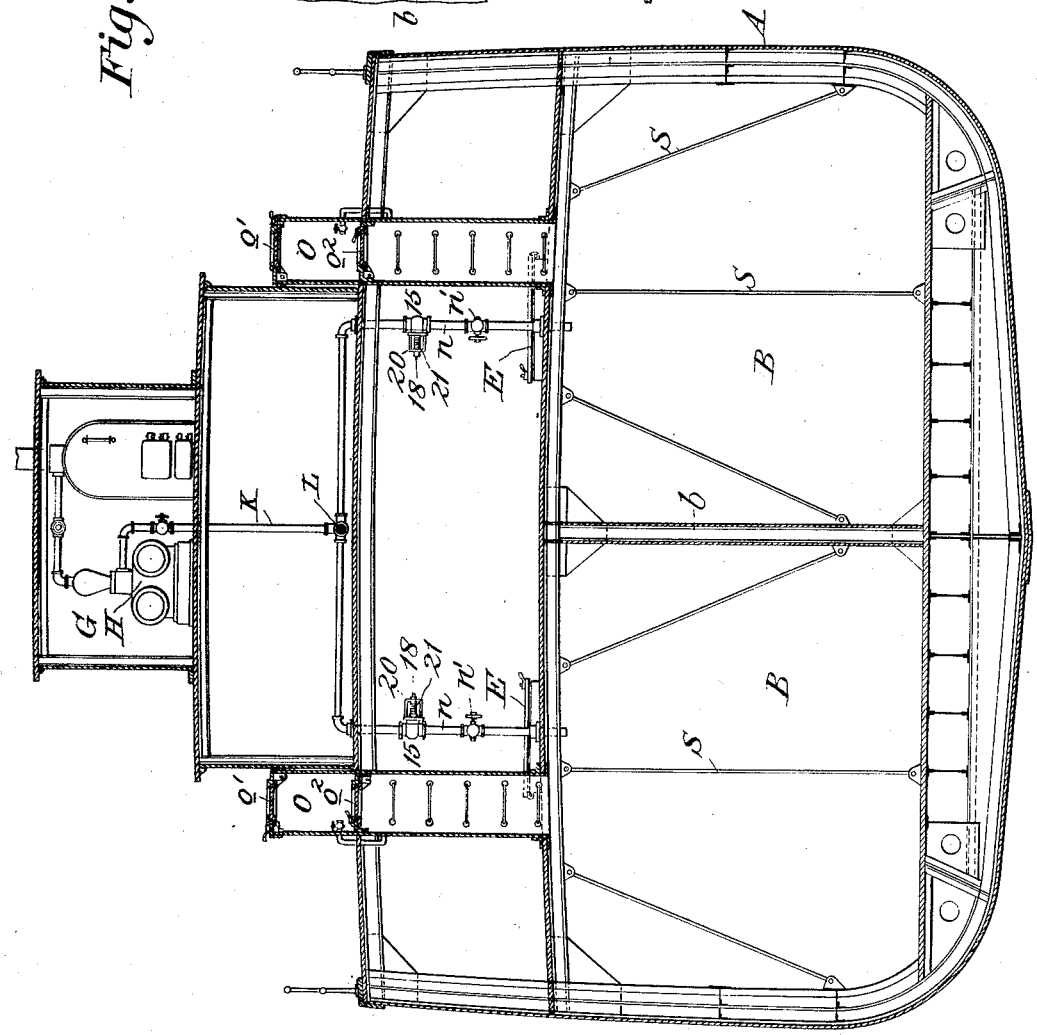

No. 851,269. PATENTED APR. 23, 1907.
W. W. WOTHERSPOON & R. O. KING.
VESSEL CONSTRUCTION.
APPLICATION FILED NOV. 30, 1906.

3 SHEETS—SHEET 1.

Witnesses
L. E. Morrison
Chas. E. Gordon

Inventors
W. W. Wotherspoon
R. O. King
By W. R. Kennedy Attorney

UNITED STATES PATENT OFFICE.

WILLIAM W. WOTHERSPOON, OF NEW YORK, AND ROBERT O. KING, OF NORTH TONAWANDA, NEW YORK.

VESSEL CONSTRUCTION.

No. 851,269.      Specification of Letters Patent.      Patented April 23, 1907.

Application filed November 30, 1906. Serial No. 345,820.

*To all whom it may concern:*

Be it known that we, WILLIAM W. WOTHERSPOON, of New York, in the county of New York and State of New York, and ROBERT O. KING, of North Tonawanda, in the county of Niagara and State of New York, have invented a new and useful Improvement in Vessel Construction, of which the following is a specification.

This invention relates to the construction of vessels, such as ships and floating dry-docks, the objects being to guard against the sinking of vessels, to provide for the raising of sunken vessels, and the removal and recovery of stranded vessels.

The invention consists primarily in constructing the holds or compartments of the vessel so that they may at will be rendered air-tight or substantially so; providing each with an air-lock, and arranging for the introduction of air under pressure into the compartments, in order to expel any water which may have entered therein.

In carrying our invention into effect in its application particularly to power-driven vessels, such as steamships, the various compartments of the hull, such as the holds, the engine and boiler rooms, the coal bunkers, tunnels, ballast tanks, etc., are so formed that the ordinary passages of communication with the outside, may be closed air-tight or practically so in order that air introduced therein under pressure may be condensed sufficiently to force out any water entering the hull. In connection with the compartments, air-locks are provided to enable workmen to enter the same from the outside, while the pressure is maintained, in order to repair the leaks; and an air-compressing plant is provided, connected by controllable communications with the various compartments; whereby, in the event of leakage of water into any of the compartments, air may be forced therein to expel the same.

Referring to the drawings:—Figure 1 is a longitudinal section through the hull of a vessel having our invention applied thereto. Fig. 2 is a transverse vertical section of the same on the line *a—a* of Fig. 1. Fig. 3 is a sectional elevation showing a single air-lock formed to afford entrance to two adjacent compartments. Fig. 4 is a sectional elevation of a smokestack having an air-lock embodied therein. Fig. 5 is a sectional elevation of a form of reducing valve used to regulate the pressure admitted to the compartments. Fig. 6 is a top plan view of the preferred form of air-tight covering for the hatchway. Fig. 7 is a vertical section through the same on the line *b—b* of the preceding figure.

In the accompanying drawings, which represent only so much of a vessel as is necessary to illustrate the application and operation of our invention, A represents the hull, provided at its front and rear with holds or compartments B B, etc., intermediate of which is the engine room C and the boiler room D. As shown, the holds B are separated by vertical partitions *b*, while the engine room and boiler room are separated from each other by the vertical partition *d*, and they are separated from the adjacent holds B by vertical partitions *e*.

E represents hatches, closing hatchways as usual through the deck into the holds; and F F represent smoke-flues extending upward through the deck from the furnaces.

In applying our invention, the hatches are so formed, as by the provision of packing or otherwise, that they will close the hatchways air-tight or practically so; and in order to render the boiler room air-tight, means are provided for sealing the smoke-flues, either by the application of lids or caps *f* to their upper ends, or by other suitable means. So also any other of the usual openings communicating with the outside from the compartments, such as port holes, sky-lights, ventilating shafts, etc., are sealed air-tight, in order that air may be forced under pressure into the compartments and condensed sufficiently to expel any water which may have entered through a leak.

Air under pressure is introduced into the various compartments through a system of pipes leading thereto from an air-compressing plant G, situated preferably at the upper deck level, and comprising an air-compressing pump H and an operating engine I. The compressed air from the pump passes by vertical pipe K to a horizontal main distributing pipe L, from which main pipe, vertical branch pipes *n* lead downward and enter the compartments, each branch pipe being provided with a controlling valve *n'*, by means of which the admission of air to the various compartments may be independently controlled.

Each of the compartments is provided with an air-lock O through which the workmen may enter the compartments while the pressure is maintained, for the purpose of repairing leaks. These air-locks consist as usual of a chamber having a door o' communicating with the outside, and a second door o² communicating with the interior of the compartment.

In the operation of our invention, if a leak occurs or a hole is stove in the bottom of the hull, that compartment in which the leak occurs is closed air-tight, and the controlling valve n' in its branch pipe n is opened. The compressing pump is then started, and air forced in, with the result that the water will be driven out through the hole in the bottom through which it entered. While the pressure of air is maintained in the leaking compartment, workmen may enter the same through the air-lock and make such repairs as are necessary, either permanent repairs, or such temporary repairs as would enable the vessel to be taken into port. In the event of the leak occurring or a hole being stove in the side of the hull, the pressure of air in the compartment will expel the water to a level corresponding with the top of the hole, and the hole may then be closed by the workmen from the inside, starting at the top of the hole and applying the covering gradually in a downward direction. The water remaining in the compartment may then be pumped out in the usual manner. By constructing the engine room as a separate compartment from the boiler room, if the leak occurs in the former only, there would be no interference with the operation of the engines after the engine room had been freed of water.

In order that the tops of the compartments in which the air is forced may be prevented from being strained by the internal pressure, we preferably employ vertical tie-rods S connected respectively with the tops and bottoms of the compartments. Or other appropriate means may be employed for this purpose. It will be understood that it is only necessary to construct such compartments, in the manner described, as are liable to injury, such as those at the sides and bottom of the hull; or only such compartments may be thus constructed as the filling of which by water would cause the vessel to sink. It will be understood also that the details of our invention may be variously modified and changed to meet the different conditions encountered in practice, as regards the type of vessel, the arrangement and construction of the holds or compartments, and other features peculiar to varying types of ship construction. For instance, other means than the tie-rods shown for strengthening the holds or compartments, may be employed for this purpose, for said compartments may be strengthened by appropriate braces applied externally. Furthermore instead of employing an air-lock for each compartment, the air-lock may be formed with a single entrance chamber and two branch chambers, communicating respectively with two adjacent compartments, as shown in Fig. 3. Here it will be seen that the entrance chamber 1, closed by a door 2 at its upper end, communicates at its lower end with two branch tubes or chambers, 3 and 4, entering respectively two adjacent holds 5 and 6, the communication with these holds being controlled by doors 7 and 8.

Where the communication of the compartment with the outside is in the form of a ventilating funnel, the air-lock may be built in as a part of the same, as shown in Fig. 1. Here it will be seen that the tube forming a downward continuation of the swiveling funnel, is provided with an upper door 9 which may be exposed by lifting the funnel off, and it is further provided with a lower door 10. It is preferable to construct this tube with fittings so that the doors may be instantly applied, whenever the occasion arises. The air-lock may be similarly built in as a part of the smokestack, as illustrated in Fig. 4, where it will be seen that above the upper deck the smokestack is provided with a removable section or door 11, by which access may be had to its interior. Just below this section, and at about a level of the upper deck, the stack is provided with fittings for an upper air-lock door 12; and some distance below it is provided with similar fittings 13 for a lower air-lock door, 13×, which doors are preferably applied to their fittings to perform their functions, whenever it is desired, in a case of leakage, to introduce air pressure into the boiler room. Below the door 13 a second removable section 14 is provided in the stack, in order to permit the workmen entering through the air-lock to gain access to the boiler room.

In the event of leakage into several holds or compartments, the degree of pressure of air necessary to expel the water may vary according to the location of the leak, the list of the vessel and other conditions, such as would cause different hydrostatic pressures. To meet these conditions, we propose to provide for adjusting the air pressure admitted to the several compartments, according to the resistance to be encountered. This may be conveniently effected by applying to each of the vertical pipes n, a reducing valve 15, which may be of any well known form, adjustable to different pressures. A valve of this character is illustrated in Fig. 5, and embodies a valve seat 16, communicating on opposite sides with the pipe n, against which seat a valve proper 17 closes. The valve proper is provided with a stem 18 extended through a stuffing box to the outside, and through a guide plate 20, a spiral spring 21 encircling the stem and bearing at one end against an adjusting nut 22, and at its opposite end against a head 23 on the stem. By adjusting this spring to different pressures, the incoming pressure of air may be correspondingly reduced as it passes by the valve.

In closing the hatchway air-tight, while this may be accomplished in various ways, we prefer to adopt the construction shown in Figs. 6 and 7, where it will be seen that the hatchway is closed by a sliding covering or door 25, adapted to fit beneath overhanging guides 26, a packing of rubber or equivalent material being interposed between the covering and the guides in order to form an air-tight joint. By the use of a covering of this character, the hatchway may be instantly closed air-tight when the occasion arises.

As shown by the dotted lines in Fig. 7, the air-lock may be applied to the sliding covering 25.

Having thus described our invention, what we claim is:—

1. In combination with a vessel's hull provided with a plurality of compartments, means for sealing at will, air-tight or substantially so, the usual communications of said compartments with the outside, air-locks associated with the several compartments, a source of air pressure common to all of said compartments, and connections between said air-pressure source and said compartments for introducing air into the compartments; whereby in the event of leakage of water into a number of said compartments air may be forced therein to expel the same.

2. In combination with a vessel's hull formed with holds, means for sealing air-tight or substantially so, the usual communications with the outside, means for forcing air under pressure into said holds, means for independently controlling the entrance of air into the individual holds, and an air-lock communicating with each hold.

3. In combination with a vessel's hull formed with compartments, means for rendering said compartments air-tight or substantially so, air-locks associated with said compartments, an air-compressor at or about the upper deck level, and means for introducing air under pressure into the compartments.

4. In combination with a vessel's hull provided with holds or compartments, means for sealing said compartments air-tight or substantially so, air-locks associated with the compartments, an air-compressor situated above the compartments, a main distributing pipe for the compressed air communicating with the air-compressor, and branch pipes leading from the main distributing pipe to the respective compartments.

5. In combination with a vessel's hull provided with an engine room and boiler room separated by a partition, means for rendering the engine room air-tight or substantially so, an air-lock communicating with the engine room, and means for forcing air under pressure into the engine room; whereby in the event of leakage into the engine room only, the operation of the engines may be continued after the water is expelled.

6. In combination with a vessel's hull provided with a plurality of compartments, means for rendering said compartments air-tight or substantially so, means for introducing air under pressure into said compartments, and means for adjusting the air pressure admitted to the several compartments according to the different hydrostatic pressures encountered therein.

7. In combination with a vessel's hull provided with a plurality of compartments, means for rendering said compartments air-tight or substantially so, a source of air pressure common to said compartments, individual connections between the source of air pressure and the compartments, and reducing valves in said connections.

8. In combination with a vessel's hull provided with two adjacent compartments, an air-lock comprising a chamber communicating with the outside, a door closing said chamber, two chambers branching from the first and communicating respectively with the two compartments, and doors controlling the communication of said branching chambers with the compartments.

9. In combination with adjacent compartments, an air-lock having an upper door communicating with the outside and two lower doors communicating respectively with the two compartments.

10. In combination with a vessel's hull provided with a boiler room, a smokestack extending therefrom to the outside, two air-lock doors in said stack, one above the other, a removal section in the stack above the upper air-lock door, and a second removal section in the stack communicating with the boiler room.

11. In a vessel and in combination with a ventilating funnel and its shaft, upper and lower air-lock doors situated in said shaft.

In testimony whereof we hereunto set our hands this 24th day of November—1906, in the presence of two attesting witnesses:—

WILLIAM W. WOTHERSPOON.
ROBERT O. KING.

Witnesses:
  GEO. A. HOFFMAN,
  W. R. KENNEDY.